United States Patent [19]

Belart et al.

[11] Patent Number: 4,555,144
[45] Date of Patent: Nov. 26, 1985

[54] METHOD AND APPARATUS FOR CONTROLLING AND MONITORING HYDRAULIC BRAKE SLIP

[75] Inventors: Juan Belart, Walldorf; Jochen Burgdorf, Offenbach; Dieter Kircher, Frankfurt am Main; Hans-Wilhelm Bleckmann, Obermoerlen; Lutz Weise, Mainz, all of Fed. Rep. of Germany

[73] Assignee: ITT Industries, Inc., New York, N.Y.

[21] Appl. No.: 514,501

[22] Filed: Jul. 18, 1983

[30] Foreign Application Priority Data
Aug. 28, 1982 [DE] Fed. Rep. of Germany ....... 3232052

[51] Int. Cl.$^4$ ............................ B60T 8/02; B60T 8/04
[52] U.S. Cl. .................................. 303/92; 303/114; 303/119
[58] Field of Search .................. 303/114, 92, 119, 93, 303/117, 100, 116, 113, 68, 75, 77, 79, 81, 10, DIG. 1, 6; 188/181, 345

[56] References Cited

U.S. PATENT DOCUMENTS

| 4,415,210 | 11/1983 | Belart et al. | 303/92 X |
| 4,416,491 | 11/1983 | Belart et al. | 303/113 |
| 4,440,454 | 4/1984 | Belart et al. | 303/119 X |

Primary Examiner—Douglas C. Butler
Attorney, Agent, or Firm—James B. Raden; William J. Michals

[57] ABSTRACT

In the braking system of a motor vehicle, a hydraulically or electromagnetically actuatable valve is inserted into the return line to control and monitor hydraulic brake slip control devices supplied with energy from an external source. This valve opens or closes the return passage of hydraulic fluid from pressure reducing valves of static brake circuits in dependence upon the dynamic pressure developing in the booster chamber of brake valve network or in the prechamber of the master cylinder upon application of the brake or upon start of the brake slip control. Pressure reduction in the static brake circuits for preventing a wheel lock-up will thereby be avoided, if in the event of a control action no dynamic pressure develops in the booster chamber or in the prechamber on account of a defect.

16 Claims, 5 Drawing Figures

METHOD AND APPARATUS FOR CONTROLLING AND MONITORING HYDRAULIC BRAKE SLIP

BACKGROUND OF THE INVENTION

This invention relates to a method and apparatus for controlling and monitoring vehicular hydraulic brake slip control devices supplied with energy from an external source, wherein hydraulic pressure is transmitted to the brake wheel cylinders via at least one static brake circuit and/or at least one dynamic brake circuit, and wherein in the event of a control action taking place fluid flow is admitted from a dynamic circuit into the static brake circuit. Apparatus to implement this method is also claimed as part of this invention.

Brake slip control devices are well known. In such devices electromagnetically or hydraulically actuated valves which inhibit the fluid passage in the event of a pressure failure in the external energy supply system, are inserted in the connecting lines providing hydraulic fluid flow to the prechamber of the master cylinder and thence to the static circuits. Valves are also positioned in the pressure fluid return line from pressure reducing valves to a pressure compensating reservoir (German published patent applications DE-OS No. 3,040,561 filed in the U.S. as patent application Ser. No. 315,819 on Oct. 28, 1981, now U.S. Pat. No. 4,415,210 and DE-OS No. 3,040,562 filed in the U.S. as patent application Ser. No. 316,153 on Oct. 28, 1981, now U.S. Pat. No. 4,416,491). On a failure of the external energy, these valves act to prevent the static circuits from reaching an empty condition and also act to prevent an excessive amount of hydraulic fluid flow from reaching the compensating reservoirs.

A disadvantage of these known devices arises in that these valves will not respond to a defect in the brake valve as long as the pressure in the external energy supply system is maintained.

SUMMARY OF THE INVENTION

It is, therefore, an object of this invention to control and monitor a brake slip control device to prevent the static circuits from reaching an empty condition even if sufficient brake pressure cannot be built up in the dynamic circuit(s) as a result of a failure, although the external energy supply system is intact and exposed to operating pressure.

This object can be achieved in a surprisingly simple and technologically advanced manner by a method of the type initially described. By this method, the brake slip control function of the static circuits, and in particular the pressure decrease which occurs when the tendency to lock starts, is released or halted in dependence on the dynamic pressure built up on actuation of the brake or on the commencement of the control action.

With this method, the external energy supply system is monitored and in addition the adjoining chambers are also monitored. In particular the booster chamber of the brake valve as well as, depending on where pressure readings are taken, the valve controlling the dynamic fluid flow into the static circuits, and the static circuits are monitored and prevented from being driven to an empty condition even if the external energy supply system continues to be pressurized in spite of the defect.

In an advantageous embodiment of the method of this invention, hydraulic fluid is not allowed to return from the brake wheel cylinders of the static circuits until the dynamic pressure built up on application of the brake has exceeded a predetermined threshold value. If the pressure monitoring function is performed on the booster chamber and acts, for instance, on a pressure-responsive valve, it will be a substantial advantage for the monitoring system to react to any braking action as a result of the ensuing change in pressure, and not only when the brake slip control intervenes, which consequently permits its operational reliability to be checked at all times.

By contrast, in another advantageous embodiment of this invention, if the pressure reading is taken at the prechamber into which external energy from the dynamic circuit is only admitted in the event of a control action taking place, the operational reliability check will be extended to cover also the valve controlling the dynamic fluid flow. In this case, the valve releasing or halting the pressure reduction in the static brake circuits will be actuated on any brake slip control action and thereby checked for its operational reliability.

A number of particularly advantageous apparatuses for implementing the method of this invention are disclosed, for example, the control of the pressure fluid return can be released and halted using either hydraulic and electromagnetically operated valves. For this purpose, additional valves may be inserted in the return line, or the pressure reducing valves required for the brake slip control and located in the static brake circuits may be directly released or blocked.

BRIEF DESCRIPTION OF THE DRAWINGS

Further features, advantages and possibilities of application of this invention will become apparent from the following description of the embodiments with reference to the accompanying drawings of which.

DETAILED DESCRIPTION

Figure 1:
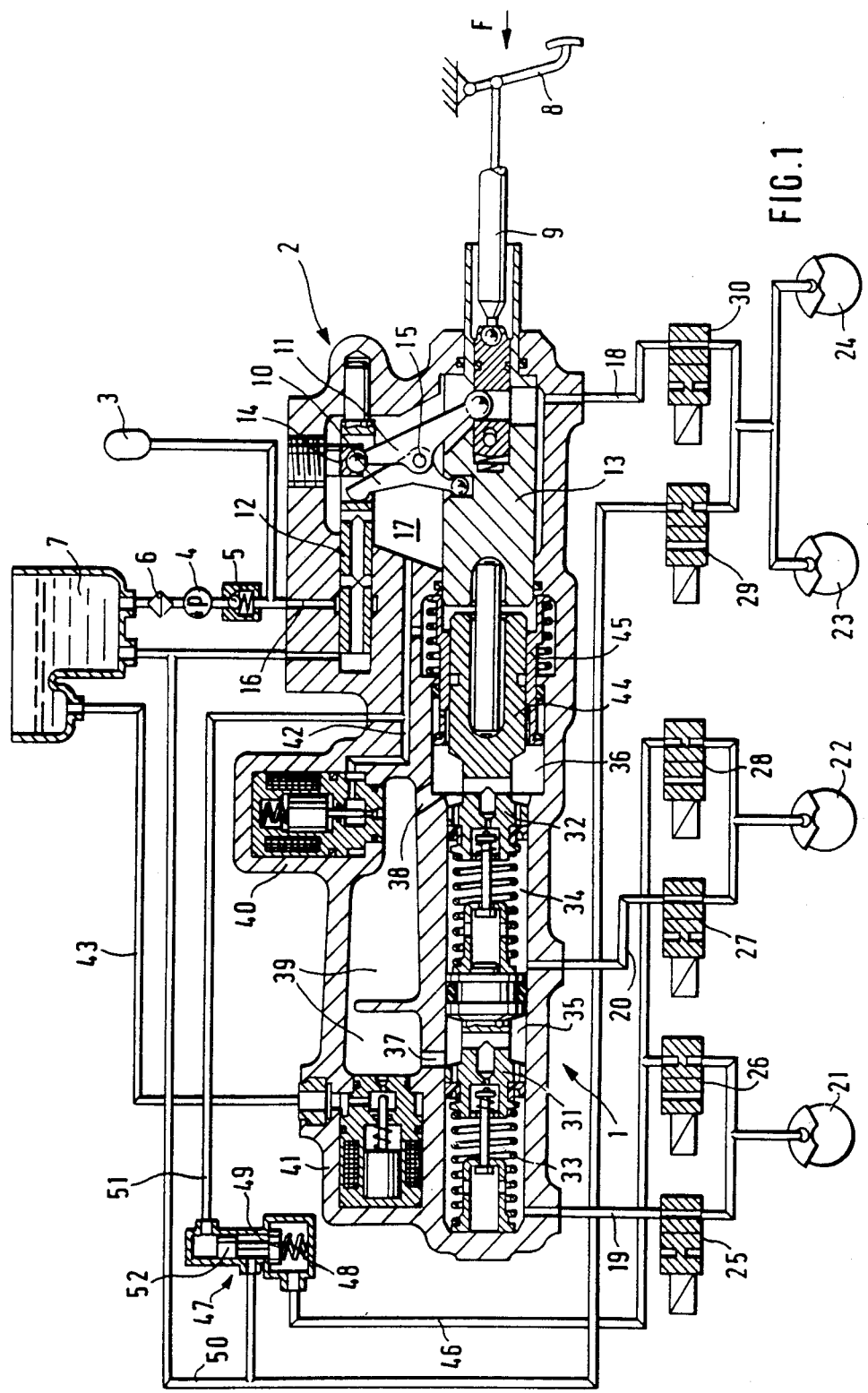
FIG. 1 is a schematically simplified view of a brake slip control device of the type embodying this invention, including a hydraulically actuated valve inserted in the hydraulic fluid return line.

In the specific embodiment of the invention shown in FIG. 1, a brake slip control device is disclosed which includes a compact hydraulic system which in turn is composed of a master cylinder newtwork 1, i.e., a tandem master cylinder, and a preceding pedal-operated brake valve arrangement 2. The most essential parts of an associated external energy supply system include at least a pressure accumulator 3, a pump 4 with associated check valve 5, and a filter 6 connecting the network 1 with a supply and pressure-compensating reservoir 7 for hydraulic fluid.

The pedal force F acting on pedal 8 during braking is transmitted through an operating rod 9 to a dual-lever arrangement 10, 11 which in turn displaces—in the sequence of the movements occurring on application of the brake—a control piston 12 and finally a booster piston 13, toward the left when viewing FIG. 1. This sequence of movements results from a comparatively high counterforce which the booster piston 13 initially produces to oppose displacement to the left. Consequently, when pressure acts in the direction of the force F upon the lower end of the lever 11 which is stationarily pivoted at the pivot connection 14, the pivot pin 15 joining the two levers 10, 11 will first be shifted to the left, resulting in a counter-clockwise movement of the lever 10 as long as piston 13 is still stationary. Displacement of the control piston 12 to the left causes external energy to be introduced into the booster chamber 17 through the central and radial channels of piston 12 and the connecting channel 16, resulting in a displacement of the piston 13 to the left and the buildup of brake pressure in the dynamic brake circuit 18.

Connected to the tandem master cylinder 1 are two static brake circuits 19 and 20. Accordingly, three separate brake circuits are available of which the two static circuits 19 and 20 connect with the left and right-hand front wheel or the associated brake cylinders 21, 22, whereas the two rear wheel brake cylinders 23, 24 are activated in parallel through the dynamic brake circuit 18. To control the increase and decrease of pressure in the presence of an imminent locked condition, electro-magnetically actuatable two-way, two-position directional control valves are inserted which are operated to reflect an open or closed position in dependence upon the wheel rotational behavior by means of an electronic control unit not shown.

As shown in FIG. 1, the tandem master cylinder 1 comprises two cylindrical pistons 31 and 32 arranged in series in respective working chambers 33, 34. Static pressure is built up in both chambers on brake application. These chambers communicate directly with the two static brake circuits 19, 20. The ends of the tandem cylinder pistons closest to the pedal form respective boundaries for the secondary chambers 35, 36 which in turn connect with a prechamber 39 through the bores 37, 38. Via a valve 40 which is closed in the de-energized state and via a connecting line 42, the prechamber 39 is connected with the booster chamber 17, while a valve 41 which is open in the de-energized state and a line 43 connect the prechamber 39 with the pressure compensating reservoir 7.

The tandem master cylinder 1 and the brake valve network 2 are in mutual engagement via an intermediate piston 44 which is integrally formed with the master cylinder piston 32. In addition, the piston 44 carries a positioning sleeve 45 which in the event of a control action taking place, prevents displacement of the master cylinder pistons 31, 32, too far to the left (as viewed in FIG. 1), thus preventing the working chambers 33, 34 from being driven to the point of reaching an empty condition.

The return line 46 through which hydraulic fluid returns from the static brake circuits 19, 20 to the pressure compensating reservoir 7 on response of the pressure reducing valves 26, 28, accommodates the hydraulically actuated valve 47 which forms the basis of the present invention and which, under the action of a compression spring 48 acting upon a valve disc 49, initially blocks the passage of fluid from the line 46 to the port opening into the return line 50 through which hydraulic fluid returns from the dynamic brake circuit 18 on energization of the pressure reducing valve 29. Return flow through the valve 47 will not be released until a sufficient amount of pressure prevails at the port 51 and displaces the valve piston 52.

When the brake is applied, pressure will be built up in the booster chamber 17 of the brake valve arrangement 2 in the manner described. If one of the wheels 21 to 24 threatens to lock, the brake slip control will be activated by an initial energization and reversal of the valves 40, 41 which are referred to as the master valves. The reversal results in an interruption of the connection from the pressure compensating reservoir 7. Dynamic fluid flow through channel 42 into the pressure chamber 39 and thence through the channels 37, 38 into the secondary chambers 35, 36 further into the working chambers 33, 34 and finally into the static circuits 19, 20 will commence. At the time of pressure development in the chamber 17 and channel 42, the valve 47 had already opened permitting a return of hydraulic fluid to the compensating reservoir 7 if in the course of the brake slip control action the pressure reducing valves 26, 28 in the static circuits had opened. However, if a failure occurs such as a failure of the external energy supply, a jammed control piston 12 or a breakage of the levers 10 or 11 no adequate pressure can develop in the channel 42 and at the control inlet of the valve 47. The path to the pressure compensating reservoir 7 via the valve 47 is not released and an undesired reduction in pressure in the static brake circuits is thereby halted. The static brake circuits are thereby prevented from reaching an empty condition. A failure of the brake circuits is thereby prevented. The brake continues to be operative, without brake slip control.

Figure 2:
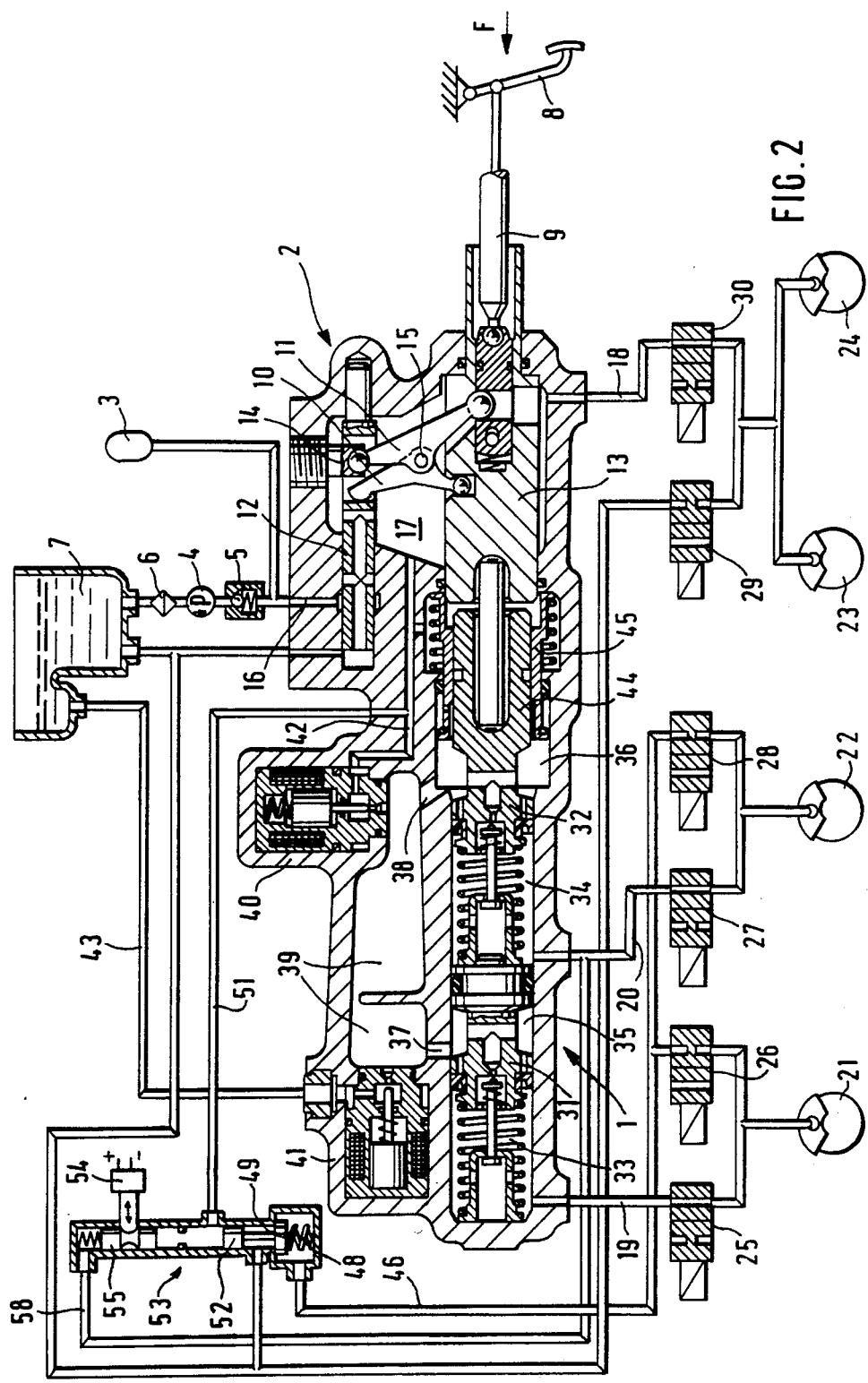
FIG. 2 is a view of the control device of FIG. 1, with the valve in the hydraulic fluid return line being, however, modified.
Figure 3:
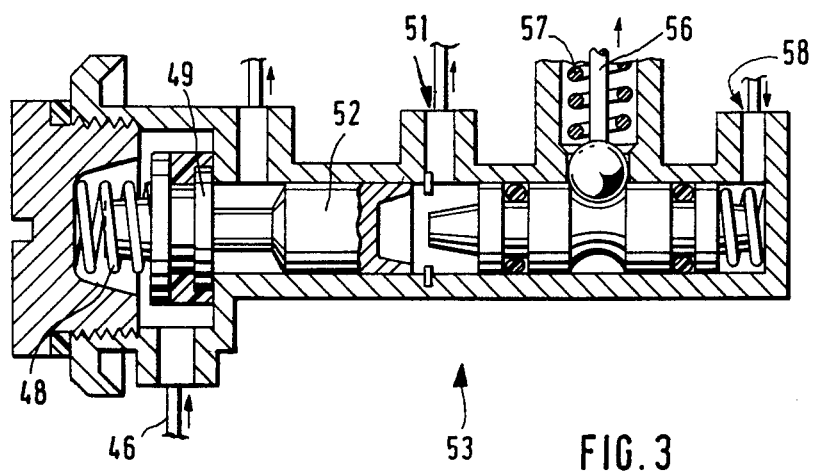
FIG. 3 is a longitudinal section of an embodiment of the hydraulically actuated valve in the return line of the arrangement of FIG. 2.

The embodiment of FIG. 2 differs from that of FIG. 1 only in the return line valve. A modified valve 53 having extended functions is substituted for the valve 47 of FIG. 1. Therefore, like parts have been assigned like reference numerals in both figures. Details of the valve 53 are shown in FIG. 3.

In addition to the parts described with reference to the valve 47 (FIG. 1), the valve 53 (FIG. 2) possesses a switch 54 which is actuated on displacement of the piston 55 out of its position shown in FIG. 2, the displacement being possible to either side. In this embodiment, displacement of the piston 55 is accomplished by displacement of the pin 56 radially (inwardly toward the axis of the piston 55 in opposition to the pressure of return spring 57 (FIG. 3). An additional port 58 (FIG. 2) connects the valve 53 with the working chamber of a static brake circuit, in the present instance with the working chamber 34 of the static brake circuit 20. In this way, piston 55 will cause a signal to be issued whenever a pressure difference exceeding a minimum value prevails between the pressure in the booster chamber 17 or the line 42 and that of the working chamber 34. The switch 54 serves to signal a fault and may be used for partial or total deactivation of the control functions, if necessary, with the actuation of time controlled switching elements and the linkage of the signals with other criteria.

Figure 5:
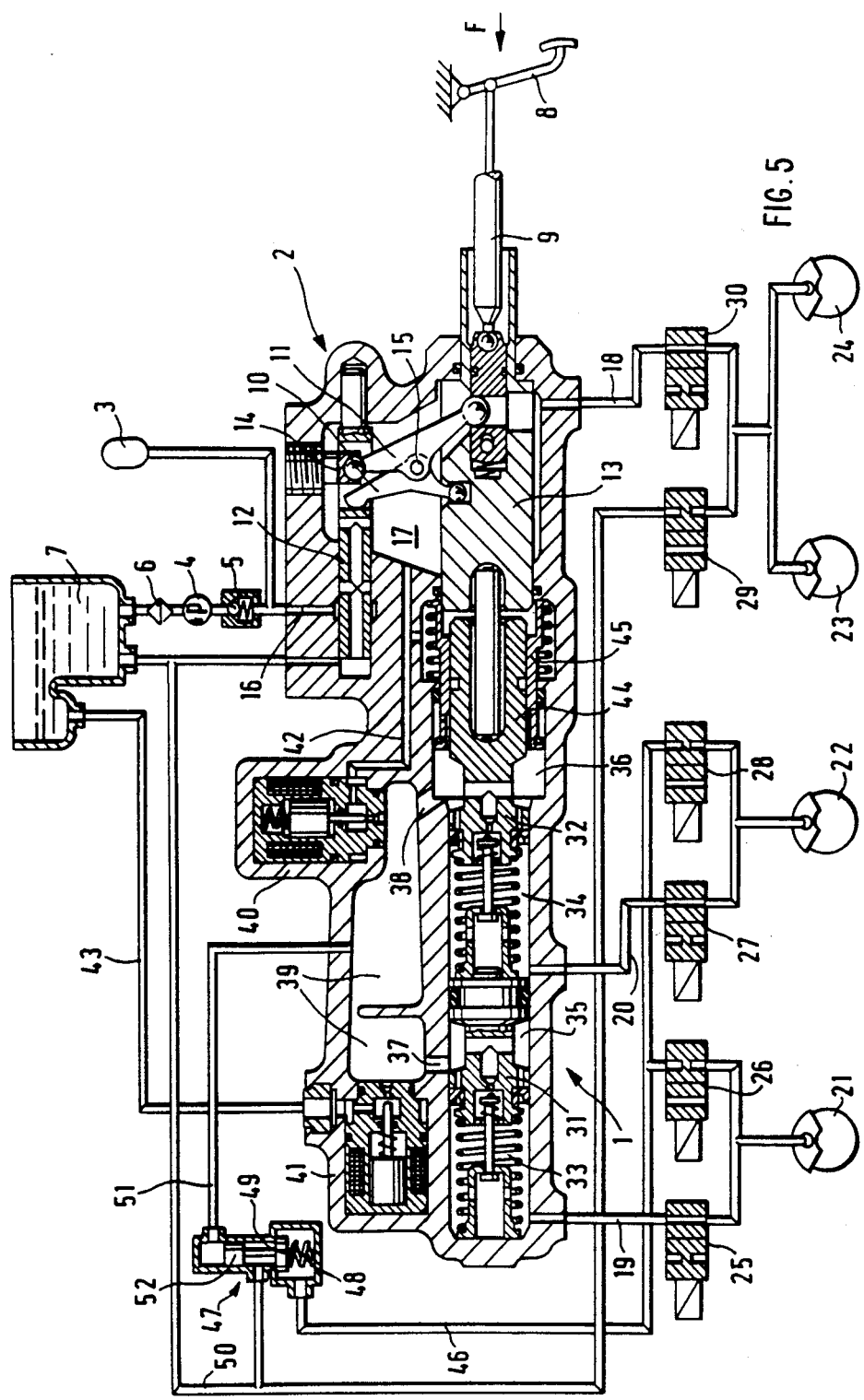
FIG. 5 is a view similar to the control device of FIG. 1 but illustrating an alternative connection.

It is also possible, as illustrated in FIG. 5, to connect valves 47, 53 to the prechamber 39 instead of the line 42 which affords the advantage that at the same time also the valves 40 and 41 can be checked for operational reliability. Only if both valves respond properly to the control check will a dynamic pressure be built up in the prechamber 39 and dynamic energy be supplied, so that a reduction in pressure via the pressure reducing valves 26, 28 as well as via the return line 46 and the valves 47, 53 is considered safe. By contrast with the connection of the valves to the line 42 as shown in FIG. 1 and FIG. 2, it is, however, a disadvantage that in the last described case the valve 47 or 53 is activated only in the presence of dynamic fluid flow into the chamber 39 and thus only on commencement of the brake slip control action.

Figure 4:
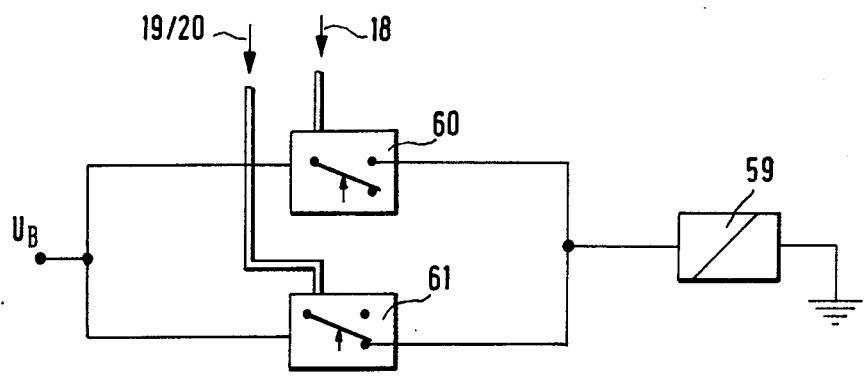
FIG. 4 is a schematic view of the connection of a signal-releasing circuit configuration to the device of FIG. 1.

FIG. 4 shows a simple circuit configuration for enabling a signal or a deactivation function to be released when the pressure building up in the booster chamber 17 and thus in the dynamic circuit 18 on application of the brake is inadequate. In FIG. 4, the deactivation or signalling function is performed by a relay 59 which is connected to the power supply $U_B$ via the two pressure responsive switches 60 and 61. The pressure responsive switch 60 connects with the dynamic brake circuit 18 of FIGS. 1 or 2, while the pressure switch 61 connects with one of the two static circuits 19 or 20. As soon as the dynamic brake circuit 18 is pressurized, the contact in the pressure switch 60 will close. Relay 59 will thereby be energized. Relay 59 will continue to be in its energized state even if, in consequence of the pressure in the connected static brake circuit 19 or 20, the path of current via the pressure switch 61 is interrupted. If, however, the dynamic brake circuit remains unpressurized when the brake is applied, for instance as a result of a jammed control piston 12 or a broken lever 10, 11, the response of the pressure switch 61 resulting from the pressure buildup in the static brake circuit 19 or 20 will cause an interruption of the power supply and thereby a drop-out of the relay 59 as well as deactivation of a control signal which is released by a contact of the relay 59.

In a further embodiment of this invention, also not shown, the valve through which the pressure fluid returns on energization of the pressure reducing valves 26, 28 of the static brake circuits, allows the free passage of fluid until the beginning of the brake slip control function. It is possible, for example, to use an electromagnetically operated valve and to energize or release the relay only after the first energization of the master valves 40, 41 has taken place. Therefore, the return line 46 will be blocked only when the control function begins and if no dynamic pressure prevails at the point where the pressure reading is taken, for instance, in the booster chamber 17 or in the connecting channel 42, which would be indicative of a defect in the system. The electromagnetically operated valve, is operated in dependence upon the energization of the master valves and its time period in the on-position may be suitably limited to approximately 20 by means of a one shot multivibrator or a stabilizing timer for closing the valve 47, 53 for a limited period of time, so that the valve is de-energized again and thus reopened following termination of the control function.

What is claimed is:

1. A method for controlling and monitoring brake slip control devices for a vehicle hydraulic braking system having a plurality of brake wheel cylinders, comprising the steps of:
   introducing braking pressure into said brake wheel cylinders energizable from an external source, said pressure being transmitted via at least one static brake circuit and one dynamic brake circuit;
   controlling a fluid flow return from static brake circuit in reaction to pressure differential between said return and dynamic circuit fluid pressures;
   said controlling being capable of carrying out and operating despite the failure of brake valve inner elements to operate and while said external source maintaining continues supply of fluid flow to said dynamic brake circuit.

2. A method as claimed in claim 1, wherein said controlling step comprises a step of blocking said fluid flow return from said brake wheel cylinders in said static brake circuit as long as the dynamic pressure generated by brake application remains below a predetermined level, said blocking prevents a complete drainage of fluid in said static brake circuit in spite of continuous supply of fluid thereto from said external source.

3. A method as claimed in claim 1, wherein:
said controlling step comprises blocking fluid flow return from said brake wheel cylinders being serviced by said static brake circuit until the dynamic pressure of fluid admitted from said dynamic brake circuit into said static brake circuit upon commencement of brake fluid control exceeds a selected threshold level.

4. A method as claimed in claim 1, wherein said controlling step comprises blocking said fluid flow return until dynamic pressure in said dynamic circuit remains below a selected level and said reduction is caused by a defect in a brake valve part communicating with said dynamic circuit.

5. A hydraulic braking system for controlling and monitoring brake slip control devices, said system comprising:
   a brake valve assembly being constantly supplied with hydraulic fluid flow from an external energy source;
   a static brake circuit and a dynamic brake circuit servicing separate wheel brake cylinders via said brake valve assembly;
   a control valve placed on a return fluid line exiting from brake cylinders in said static brake circuit;
   said control valve being connected with said dynamic circuit and blocking static return flow until dynamic pressure in said dynamic brake circuit exceeds a predetermined level of pressure in said return flow line;
   said control valve being capable of operating outside of a body of said brake valve assembly.

6. A system as claimed in claim 5, and said brake valve assemby comprising master valve means for regulating fluid flow from said dynamic circuit into said static circuit.

7. A system as claimed in claim 6, and
said master valve means comprising a pair of valves being connected with a pressure compensating reservoir, static brake and dynamic brake circuits.

8. A system as claimed in claim 5, and
said static brake circuit comprising static pressure chambers communicating with a prechamber, having a fluid flow supply thereinto being controlled by a master valve system.

9. A system as claimed in claim 5, and
and said control valve comprising a spring loaded valve piston displaceable by force of fluid pressurized by dynamic pressure in said dynamic brake circuit which is energized directly from said external energy source.

10. A system as claimed in claim 5, and said control valve being connected with a booster chamber communicating with wheel brake cylinders of said dynamic brake circuit.

11. A system as claimed in claim 10, and said control valve being connected with a prechamber for monitoring dynamic pressure therein;

said prechamber communicating with said booster chamber and a plurality of static pressure chambers connected with wheel brake cylinders of said static brake circuit.

12. A system as claimed in claim 5, and said control valve comprising a switch means being actuated by force of fluid generated by pressure differential between two selected parts of said brake valve assembly;

said switch means being located between ports connected with said parts;

said switch means for signalization of functional operability of elements between said selected parts.

13. A system as claimed in claim 12, and said switch means comprising a spring loaded pin having a center groove reactively acting with a spring loaded ball located in a port of said control valve.

14. A motor vehicle control system for regulating and monitoring of functional and structural defects in brake slip control devices, said system comprising:

a brake valve assembly energized by fluid continuously supplied by a pump being connected with a pressure compensating reservoir;

said brake valve assembly comprising a dynamic brake circuit supplying dynamic pressure to a set of wheel brake cylinders via a booster chamber;

said booster chamber communicating with a prechamber through a master valve;

said prechamber transmitting fluid flow from said booster chamber into static pressure working chambers with piston reciprocally movable therein;

a static brake circuit comprising said working chambers and a series of wheel brake cylinders independent of said brake cylinders in said dynamic brake circuits;

a return line from said brake cylinders including a control valve being connected with a selected point in said dynamic brake circuit;

said control valve blocking fluid flow in said return line at anytime when pressure in said return line being lower than pressure in a said selected point;

said control valve operating independent of engagement with inner elements of said brake valve assembly.

15. A system as claimed in claim 14, and said prechamber being equipped with a pair of master valves;

one master valve controlling an admission of fluid from said booster chamber and another master valve controlling communication of said prechamber with a pressure compensating reservoir.

16. A system as claimed in claim 14, and said selected point being said prechamber.

* * * * *